(12) United States Patent
Takashima (10) Patent No.: US 6,536,385 B1
(45) Date of Patent: Mar. 25, 2003

(54) PISTON RING

(75) Inventor: Kazutoshi Takashima, Hamamatsu (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/526,053

(22) Filed: Mar. 15, 2000

(30) Foreign Application Priority Data

Mar. 17, 1999 (JP) .................................. 11-072799

(51) Int. Cl.[7] .................................................. F02B 25/00
(52) U.S. Cl. .................................................... 123/73 C
(58) Field of Search ........................ 123/73 C; 92/158; 29/888.07; 277/434, 457, 459, 465

(56) References Cited

U.S. PATENT DOCUMENTS

| | | | |
|---|---|---|---|
| 3,721,163 A | * 3/1973 | Hill et al. | 92/158 |
| 3,814,444 A | * 6/1974 | Johnson et al. | 277/139 |
| 4,835,856 A | * 6/1989 | Azami | 29/156.6 |
| 4,848,212 A | * 7/1989 | Kawano et al. | 92/158 |
| 5,169,162 A | * 12/1992 | Azaml | 277/465 |
| 5,203,294 A | 4/1993 | Takemura et al. | |
| 5,737,999 A | * 4/1998 | Ariga | 92/158 |

\* cited by examiner

*Primary Examiner*—Noah P. Kamen
*Assistant Examiner*—Jason Benton
(74) *Attorney, Agent, or Firm*—Knobbe, Martens, Olson & Bear, LLP (57) ABSTRACT

A piston ring comprises a plurality of recesses that are formed in its outer peripheral edge. The recesses have any of a number of profiles such as semicircular, chordal, arcuate, and triangular. The piston ring controls the passage of lubricant between a region defined between the piston ring and an upper compression sealing ring. The recesses can be positioned to pass over an exhaust port formed in a cylinder wall or to pass over other regions of the cylinder wall. By passing over the exhaust port, the piston ring better accommodates fluctuations in dimensions that are induced by temperature changes by passing over other regions of the cylinder wall, the piston ring enhances the distribution of lubricant, especially in cylinders having a generally horizontal or inclined center axis.

44 Claims, 9 Drawing Sheets

*Figure 12* ically, the compression of a mixture of air and fuel typically precedes an ignition of the mixture. The ignition of the mixture results in combustion of the mixture, which causes an accompanying expansion within the combustion chamber.

PISTON RING

BACKGROUND OF THE INVENTION

1. Field of the Invention

The present invention generally relates to piston rings for internal combustion engines. In particular, the present invention relates to a lubricant control piston ring for two-stroke engines.

2. Description of Related Art

Internal combustion engines operate on alternating compression and expansion cycles, which cycles reflect a state of operation within a combustion chamber. During the compression cycle, the compression of a mixture of air and fuel typically precedes an ignition of the mixture. The ignition of the mixture results in combustion of the mixture, which causes an accompanying expansion within the combustion chamber.

The compression and expansion of the combustion chamber volume is generally enabled by a piston that reciprocates within a cylinder bore. Because the diameters of the piston and the receiving cylinder bore differ, a sealing arrangement is needed. Accordingly, one or more circumferential grooves are provided within an upper end of the piston. To provide a seal, resilient rings are installed in these grooves, which rings have a slightly larger outer diameter than the piston. The rings generally bear directly against the cylinder wall and create a seal between the sides of the piston ring groove and the cylinder wall. The degree to which these components contact one another can vary significantly due to disparate thermal expansions and thermal deformations.

Figure 1:
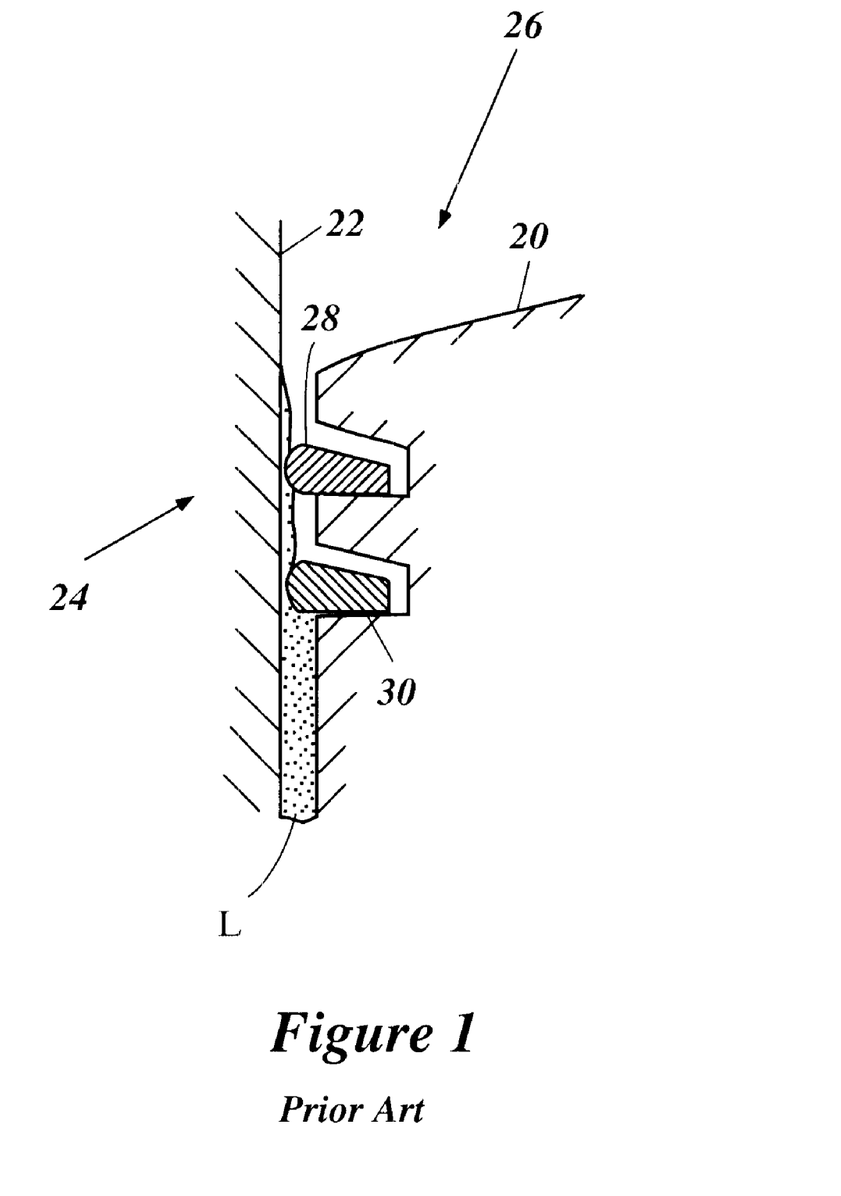
FIG. 1 is a partially sectioned side view of a prior art piston ring arrangement.

With reference now to FIG. 1, a portion of a piston 20 is shown in cross-section. The piston 20 reciprocates within a cylinder bore 22 that is formed in a cylinder body 24. The diameter of the piston 20 must be less than the diameter of the cylinder bore 22 such that the piston 20 can reciprocate relatively freely therein.

To create a substantially sealed combustion chamber 26, the piston 20 carries a plurality of piston rings. The upper piston ring is a compression ring 28 while the lower piston ring is a lubricant scraping ring 30. The compression ring 28 is designed to substantially seal against fluid migration between the combustion chamber and a crankcase (not shown). The lubricant scraping ring 30 scrapes oil or other lubricant from the cylinder wall during movement of the piston 20. Each of the rings 28, 30 is designed to provide a small ring gap between the outermost surface of the ring and the cylinder wall. Typically, the ring gap is adequate to avoid substantial interference under the most severe operation conditions (i.e., a high temperature/high load operation of the engine).

In the past, the scraping ring 30 was sized to allow lubricant to pass into the area defined between the scraping ring 30 and the sealing ring 28 under predetermined operating conditions. For instance, the outer profile was tapered to alter the wiping characteristics of the ring. Such a design, however, decreased the degree to which the scraping ring 30 contacted the cylinder bore wall. In addition, the lubricant scraping ring 30 blocked a substantial portion of the oil splashed upward from the crankcase chamber side of the piston ring 30. Because of prior scraping ring designs, too much oil was blocked by the scraping ring 30 and adequate oil was not supplied to the top compression ring 28. Such a lack of oil was especially prevalent during high temperature operation due to relative thermal expansion and deformation of engine components. As a result, the top compression ring 28 wore quickly or the cylinder bore 22 was scored by dry running the piston rings 28 within the cylinder bore 22.

Accordingly, an improved oil control ring is desired that will encourage proper lubrication of the top compression ring under all running speeds.

SUMMARY OF THE INVENTION

One aspect of the present invention involves a piston ring for use on a piston of an internal combustion engine. The piston ring comprises an outer surface and a central axis. A peripheral portion of the outer surface generally is defined at a first distance from the central axis and defines a maximum distance from the central axis. A plurality of recesses are positioned along the outer surface. At least a portion of the recesses are disposed at a second distance from the central axis. The first distance is greater than the second distance and the recesses extend through the peripheral portion of the outer surface.

Another aspect of the present invention involves a piston ring for use on a piston of an internal combustion engine. The piston ring comprises a top surface, a bottom surface, an inside surface connecting the top surface to the bottom surface and an outside surface connecting the top surface to the bottom surface. A plurality of recesses are formed in the outer surface.

Yet another aspect of the present invention involves an engine comprising a cylinder body. A cylinder bore extends through at least a portion of the cylinder body. A piston is reciprocally mounted within the cylinder bore and an annular cavity is defined between the piston and the cylinder wall. At least one piston ring is positioned substantially about a portion of the piston and extends into the annular cavity. The piston ring comprises an outer surface that is positioned substantially adjacent the cylinder wall with the outer surface comprising a plurality of recesses that define a corresponding plurality of channels extending between a first portion of the annular cavity and a second portion of the annular cavity. The first portion is separated from the second portion by the piston ring.

A further aspect of the present invention involves an engine comprising a cylinder body. A cylinder bore is formed within the cylinder body and defines a cylinder. A piston is positioned within the cylinder and is capable of reciprocating within the cylinder. A compression ring is disposed about a portion of the piston. The piston is connected to a crankshaft. The crankshaft is journaled within a crankcase chamber that is at least partially defined by a crankcase cover and a combustion chamber is defined at least in part by the cylinder bore and the piston. A scavenge passage is formed within the cylinder body such that it selectively connects the combustion chamber and the crankcase chamber. Means for controlling the lubrication of said compression ring are disposed within the cylinder body.

BRIEF DESCRIPTION OF THE DRAWINGS

The above and other features, aspects and advantages of the present invention will now be described with reference to further drawings that show several preferred arrangements that are intended to illustrate and not to limit the present invention and in which drawings.

DETAILED DESCRIPTION OF THE PREFERRED EMBODIMENTS OF THE PRESENT INVENTION

Figure 2:
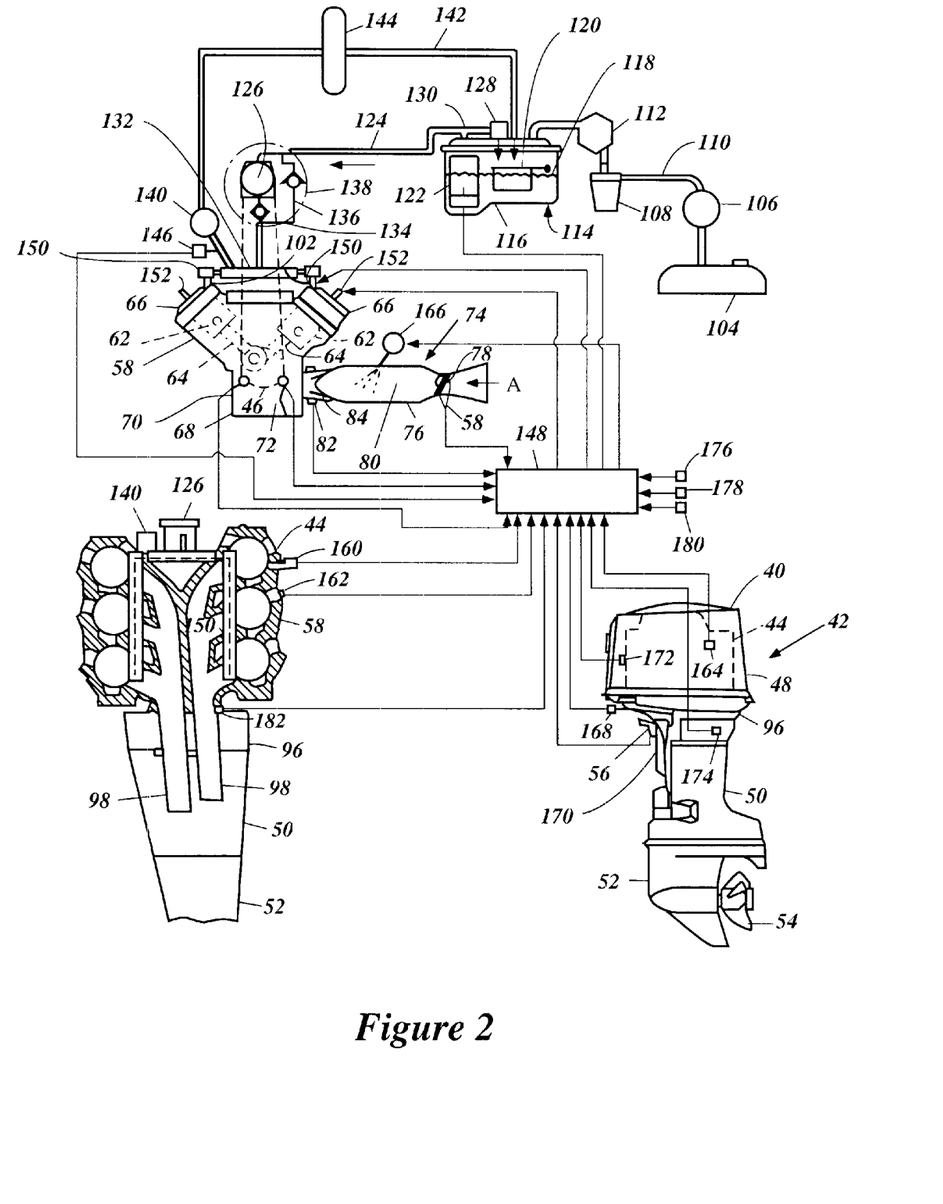
FIG. 2 is a schematic illustration having three portions that are connected by an ECU of an engine having piston rings arranged and configured in accordance with certain aspects of the present invention, the lower right hand portion of this view depicting a side elevational view of an outboard motor, the lower left hand portion depicting a partial sectional rear elevation view of the outboard motor and the upper portion depicting a top plan view of the engine and the fuel supply system with portions shown schematically and in broken line.

With reference now to the lower right portion of FIG. 2, an outboard motor having certain features of the present invention is illustrated. The outboard motor is indicated generally by the reference numeral 40 and, except as will be hereinafter noted, may be considered to be of a generally conventional construction. The present invention can also be used in a variety of other environments, such as inboard motors, scooters, motorcycles and the like. The present invention, however, has particular utility in engines having cylinders with axes that extend at an angle of less than about 45° relative to a generally horizontal plane when the engine is in use.

The illustrated outboard motor 40 is comprised of a power head 42 that contains a powering internal combustion engine 44. One of ordinary skill in the relevant art should readily recognize that the present invention can be used in engines having any number and configuration of cylinders and operating on any operating principle; however, the engine 44 preferably is of the V6 type and operates on a two stroke crankcase compression principal. Even more preferably, the engine is a two-stroke direct-injection engine.

The power head 42 also comprises a protective cowling 48 that surrounds and protects the engine 44. This protective cowling 48 is formed with an air inlet opening so that induction air for combustion in the engine 44 can be drawn from the surrounding atmosphere.

The illustrated engine 44 is supported in the power head 42 so that its crankshaft 46 rotates about a vertically extending axis. The crankshaft 46 is coupled to a driveshaft (not shown) that depends into and is journaled within a driveshaft housing 50 and lower unit 52 assembly. This driveshaft (not shown) depends into the lower unit 52 where it drives a propulsion device for an associated watercraft through a suitable transmission. In the illustrated embodiment, the propulsion device comprises a propeller 54 which is selectively driven in forward and reverse directions through a bevel gear reversing transmission (not shown) of the type well known in this art.

The outboard motor 20 also includes clamping and swivel brackets 56 or another arrangement for mounting the motor 20 to the transom of an associated watercraft. Since these types of constructions are well known in the art, further description of the brackets is not believed to be necessary to permit those skilled in the art to practice the invention. The mounting arrangement is such, however, that the height and trim angle of the propeller 54 may be adjusted, even during running.

Figure 3:
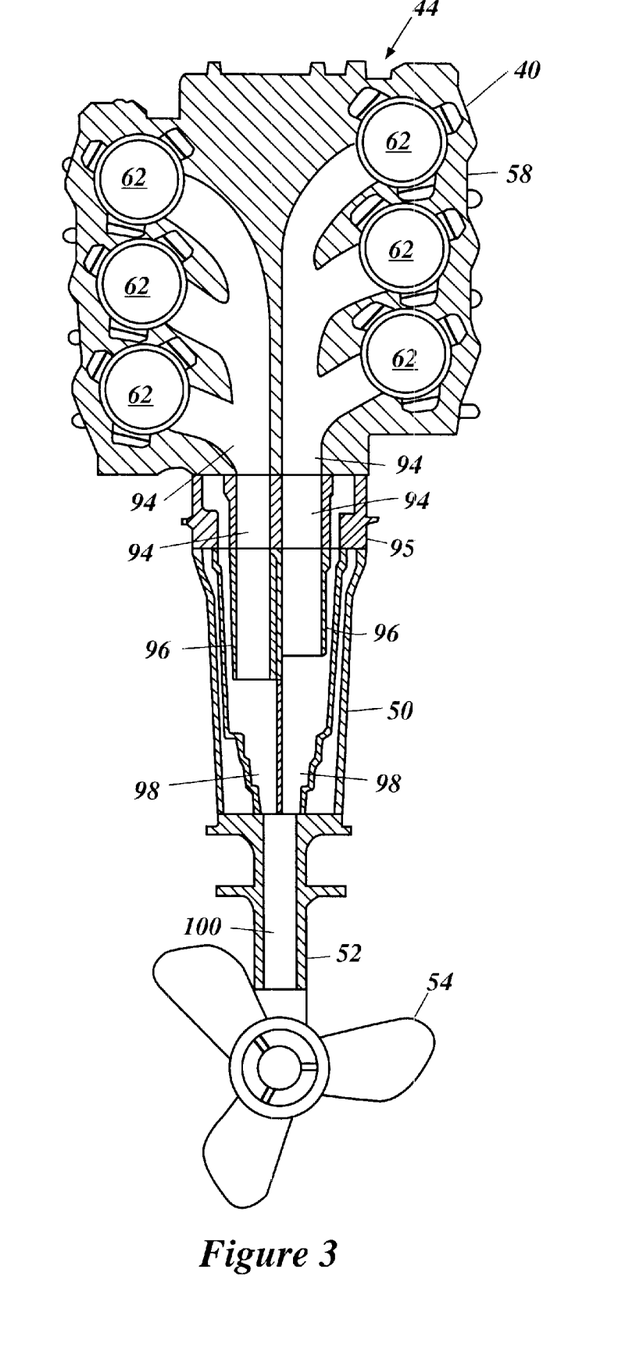
FIG. 3 is an enlarged and more complete view of the outboard motor as shown in the lower left hand portion of FIG. 2.

With reference now to the lower left portion and the upper portion of FIG. 2 and additionally to FIG. 3, the engine 44 includes a cylinder body, indicated generally by the reference numeral 58. Because of the V-type configuration employed in this arrangement, the cylinder body 58 is formed with two cylinder banks each of which has three vertically spaced cylinder bores 60. Moreover, the illustrated cylinder 58 comprises a cylinder sleeve 61 (see FIG. 5) that is positioned within the bore that forms the cylinder within the cylinder body. Preferably, the cylinder body and pistons (discussed below) are manufactured of aluminum while sleeves 61 and piston rings (discussed below) are manufactured of iron or steel. These materials are preferred to reduce weight, improve reliability and increase wear resistance between moving parts.

Pistons 62 are slidably supported in the illustrated cylinder bores 60. The pistons 62 are connected to the throws of the crankshaft 46 by connecting rods 64 for driving the crankshaft 46 in a known manner. In the illustrated arrangement, the connecting rods are attached to the piston by wrist pins that are positioned with axes of rotation that generally extend through an exhaust port of each cylinder.

Cylinder head assemblies, indicated generally by the reference numeral 66, are affixed to the banks of the cylinder body 58 and close the cylinder bores 60. These cylinder head assemblies 66, cylinder bores 60 and pistons 62 form the combustion chambers 68 of the engine 44. The cylinder body 58 can be integrally formed with a crankcase (described directly below) or can be formed separately from the crankcase and attached to the crankcase.

The crankshaft 46 rotates in a crankcase chamber defined by the cylinder body 58 and a crankcase member 70, which is connected to the cylinder body in any suitable manner. As is typical with two cycle crankcase compression engines, the sections of the crankcase chamber, indicated schematically at 72, associated with each of the cylinder bores 60 are substantially sealed from each other.

An air charge is delivered to these individual crankcase chamber sections 72 by an air induction system which appears also in the upper portion of FIG. 2 and which is indicated generally by the reference numeral 74. This induction system 74 includes an air inlet device 76 that can include a silencing arrangement. The air inlet device 76 preferably draws air from within the protective cowling 48, which air preferably has been admitted through the aforenoted inlet opening of the cowling 48.

A throttle valve 78 is provided in one or more throttle bodies that communicate with the intake device 76. Air is drawn past the throttle valve 78 to intake manifold runners 80 of an intake manifold assembly. The throttle valves 78 can be controlled in any suitable manner. The intake manifold runners 80 communicate with intake ports 82 formed in the crankcase member 70. Each of the ports 82 are associated with a respective cylinder bore 60.

Reed type check valves 84 are provided in the illustrated manifold runners 80 adjacent the intake ports 82. These reed type check valves 84 permit an air charge to be drawn into the crankcase chambers 72 when the respective pistons 62 are moving upwardly in their cylinder bores 60. As the pistons 62 move downwardly, the charge in the crankcase chambers 72 will be compressed and the respective reed type check valve 84 will close to preclude reverse flow.

Figure 4:
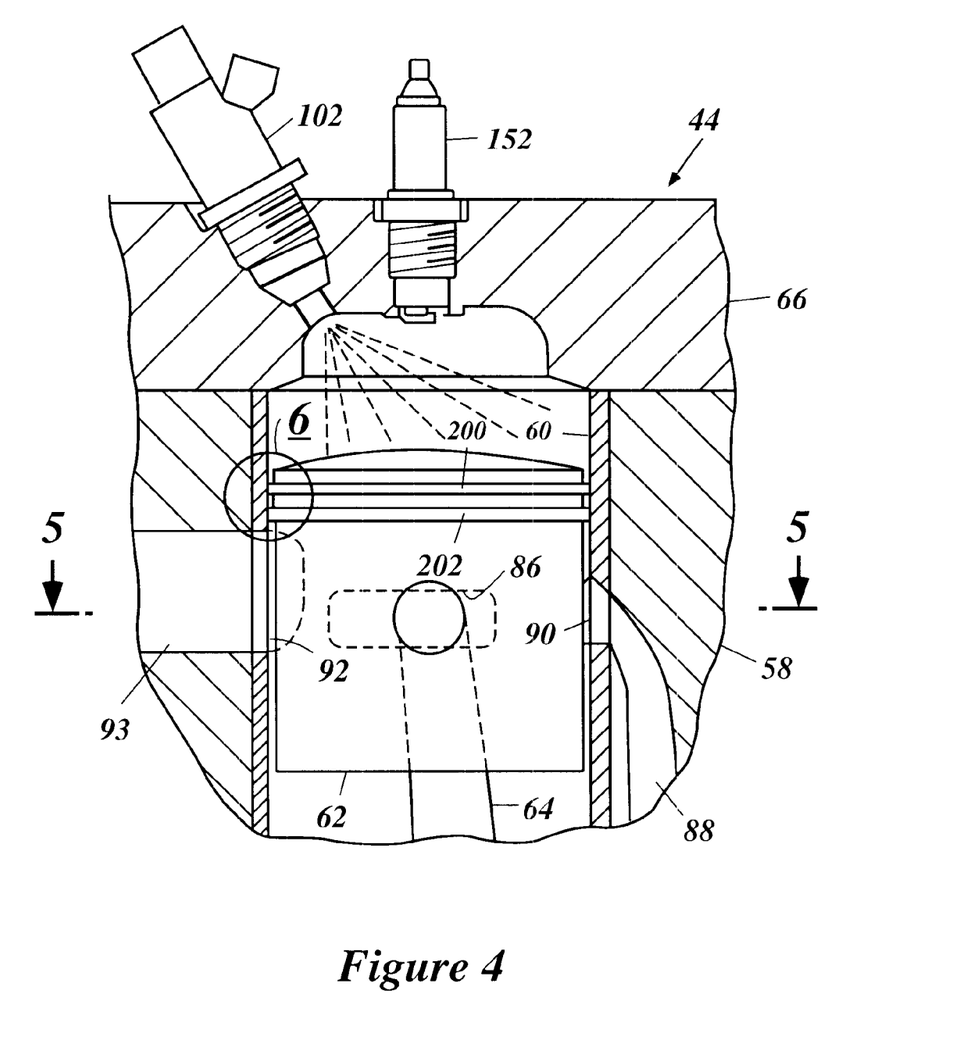
FIG. 4 is a cross-sectional view taken through a single cylinder of the engine of FIG. 2 depicting a piston ring arrangement configured and arranged in accordance with certain features, aspects and advantages of the present invention.
Figure 5:
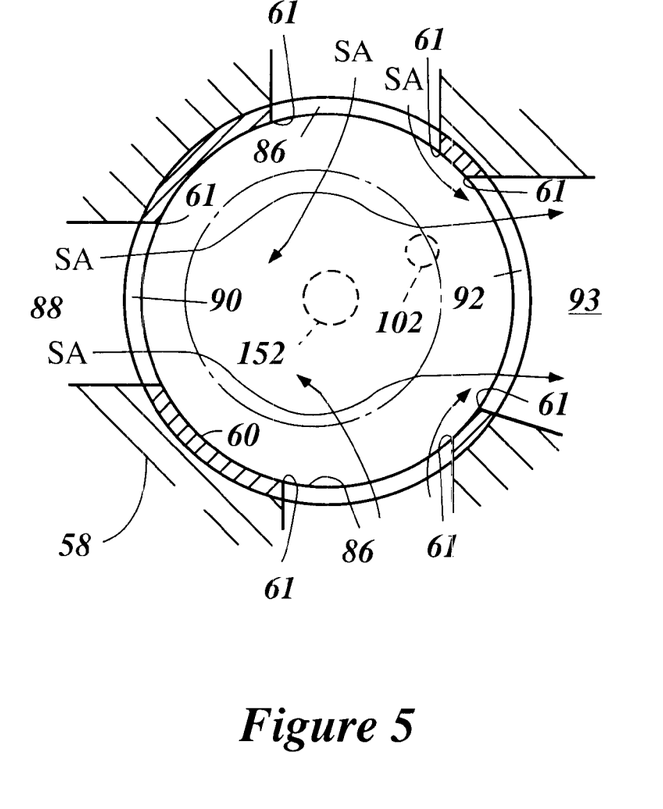
FIG. 5 is a cross-sectional view taken along the line 5—5 in FIG. 4 illustrating a scavenging air flow pattern and a path of injected fuel.

With reference now to FIGS. 4 and 5, it will be seen that each illustrated cylinder bore 60 is provided with a scavenging system. In the illustrated embodiment, the scavenging system preferably is of the Schnuerle type and includes a pair of side, main scavenge ports 86 and a center, auxiliary scavenge port 88. The scavenge passages connect the crankcase chambers 72 with each of the scavenge ports 86, 88. As is well known in two cycle practice, the scavenge ports 86, 88 are opened and closed by the reciprocation of the pistons 62 in the cylinder bores 60.

It should be noted that the main scavenge ports 86 are disposed on opposite sides of an exhaust port 92 which is diametrically opposite the auxiliary scavenge port 88. With reference to the lower left hand portion of FIG. 2 and to FIG. 3, the exhaust ports 92 communicate with an exhaust manifold 94 via exhaust passage 93, both of which members 93, 94 desirably are formed within the cylinder body 58. Preferably, there is an exhaust manifold 94 for each bank of cylinders.

With reference to FIG. 3, the exhaust manifolds 94 preferably extend through an exhaust guide plate 95 and terminate in exhaust pipes 96 that depend into a pair of expansion chambers 98 formed in the driveshaft housing 50 and lower unit 52. These expansion chambers 98 communicate with a suitable high-speed underwater exhaust gas discharge and a low-speed above-water exhaust gas discharge of any known type. The underwater exhaust gas discharge is shown primarily in FIG. 3 and includes a conduit 100 that depends through the lower unit 52 and which communicates with the hub underwater discharge formed in the propeller 54.

The illustrated engine 44 features a direct fuel injection system. This fuel injection system generally is schematically shown in the upper portion of FIG. 2. In this arrangement, fuel injectors 102 are mounted in the cylinder head assembly 66 so as to spray fuel from the fuel supply system directly into the combustion chambers 68. The location and functioning of these fuel injectors 102 will be described after the system which supplies fuel to them has been described.

As is typical with outboard motor practice, the outboard motor 40 is supplied with fuel from a main fuel tank 104 that is normally mounted within the hull of the associated watercraft. Fuel is supplied from this tank 104 by a first low pressure pump 106 to a fuel filter 108 that is mounted within the protective cowling 48. The connection from the fuel tank 104 to the filter 108 preferably includes a conduit 110 having a quick disconnect coupling of a known type.

A second, engine driven low pressure fuel pump 112 in the power head 42 collects the fuel from the illustrated fuel filter 108 and delivers it to a vapor separator, indicated generally by the reference numeral 114. The low pressure fuel pumps 112 may be of the type that are operated by crankcase pressure variations, as is well known in this art.

The illustrated vapor separator 114 includes an outer housing 116 that is mounted at a suitable location within the protective cowling 48. A level of fuel, indicated at 118 is maintained in this housing 116 by a valve operated by a float 120.

Contained within the illustrated housing 116 is an electrically driven pressure pump 122 which develops a higher pressure than the pump 112 but a pressure that is not really high enough for effective high pressure direct cylinder injection.

Fuel preferably is discharged from the vapor separator housing 116 by the pump 122 through a supply conduit 124 to a high pressure, engine driven, positive displacement pump 126. The pump 126 may be of any known type and preferably has one or more plungers operated by cams for developing extremely high pressures by positive displacement. The pressure at which fuel is delivered to the high pressure pump 126 is regulated by a low pressure regulator 128 and a return line 130. Fuel can be returned to the vapor separator through the return line 130.

The high pressure pump 126 delivers fuel under pressure to a main fuel manifold 132 through a conduit in which a check valve 134 is positioned. A parallel conduit 136 extends around the high pressure pump 126 to the main fuel manifold. A check valve 138 is provided in this bypass line 136 so that when the high pressure pump 126 is generating high pressure fluid, no flow will occur through the line 136.

A high pressure regulator 140 is provided in the main fuel manifold 132 and limits the maximum pressure of the fuel supply to the fuel injectors 102. This is done by dumping fuel back to the vapor separator assembly 114 through a return line 142. A fuel heat exchanger or cooler 144 may be provided in this return line 142 to ensure that the fuel is not at too high a temperature.

A pressure sensing device 146 also is provided in the main fuel manifold 132 for providing a fuel pressure signal to an ECU, indicated at 148 in FIG. 2 for controlling the engine systems.

The main fuel manifold 132 supplies fuel to a pair of fuel rails 150 each of which is associated with a respective one of the cylinder banks. The fuel rails 150 each supply fuel in a known manner to the fuel injectors 102 of the respective cylinder banks.

As seen in FIGS. 4 and 5, the fuel injectors 102 are mounted in the cylinder head assemblies 66 and, in the illustrated arrangement, over the exhaust ports 92 on the exhaust side of the engine 44. These injectors 102 spray downwardly toward the heads of the pistons 62. The fuel injectors 102 are preferably of the solenoid operated type and have a solenoid valve which, when opened, controls the discharge of fuel into the combustion chambers 68 (as shown in broken lines in FIG. 4) so as to provide a fuel patch in the combustion chamber 68.

Spark plugs 152 are mounted in the cylinder head assemblies 66 and have their spark gaps disposed substantially on the axis of the cylinder bores 60. These spark plugs 152 are fired by an ignition circuit under the control of the ECU 148.

The ECU 148 controls the timing of firing of the spark plugs 152 and the beginning and duration of fuel injection by the injector 102. To this end, a number of sensors are provided that sense engine running conditions, ambient conditions or conditions of the outboard motor 40 that will effect engine performance. Certain of the sensors are shown schematically in FIG. 2 and will be described by reference to that figure. It should be readily apparent to those skilled in the art, however, that other types of sensing and control arrangements may be provided.

A crank angle sensor 154 is associated with the crankshaft 46. This sensor 154 provides not only a signal of crank angle but, by comparing that signal with time, an indication of crankshaft rotational speed.

There is also provided a crankcase pressure sensor 156 which senses the pressure in one or all of the crankcase chambers 72. By measuring crankcase pressure at a particular crank angle, engine air induction amount can be determined.

Engine or operator demand is determined by a throttle position sensor 158 that operates in conjunction with a throttle valve 78 so as to determine this function.

The ECU 148 operates on a feedback control condition and thus, an air fuel ratio sensor 160 is provided that communicates with the combustion chambers 68 or exhaust port 92 of at least one of the cylinder. Preferably, an oxygen sensor is utilized for this purpose, although other types of devices may be employed.

In order to provide a good indication of the fuel/air ratio, the oxygen sensor 160 is positioned so that it will sense the combustion products near the completion of combustion and before a fresh charge of air is delivered to the combustion chamber 68. Therefore, the oxygen sensor 160 (FIG. 2) is provided. Preferably, the oxygen sensor's probe opens into the cylinder bore 60 at a point that is disposed slightly vertically above the upper edge of the exhaust port 92. In this way, the oxygen sensor 160 will be in a position to receive combustion products immediately before opening of the exhaust port 92 and before the opening of the scavenge ports 88, 90 so that it will sense the combustion products at the time combustion has been substantially completed.

Engine temperature is sensed by an engine temperature sensor 162.

The temperature of the cooling water drawn from the body of water in which the watercraft or outboard motor 40 is operated is measured by a water temperature sensor 164.

In addition to controlling timing of firing of the spark plugs 152 and initiation and duration of fuel injection by the fuel injectors 102, the ECU 148 may also control a lubricating system. This is comprised of an oil supply system including a pump 166 that sprays oil into the intake passages 80 for engine lubrication. In addition, some forms of direct lubrication may be also employed for delivering lubricant directly to certain components of the engine. Moreover, oil or other lubricant can be splashed from within the crankcase to lubricate the pistons, wristpins and other internal moving connections.

It has already been noted that the adjustment of the angle of the propeller 54 will change the vertical position of its high-speed exhaust discharge and accordingly the back pressure. Thus, there are provided additional sensors which sense factors that will indicate this depth. These comprise an engine height sensor 168 that is mounted on the outboard motor 40 and that senses its height adjustment. Also, a trim angle sensor 170 is provided that senses the adjusted trim angle.

Other sensors also can be used for component control and some of these are associated with the engine 44 or the outboard motor 40 itself. These may include an engine vibration or knock sensor 172 and a neutral sensor 174. The neutral sensor 174 cooperates with the aforenoted forward, neutral, reverse transmission and will provide an indication of when the watercraft is operating in neutral. Also shown schematically in FIG. 2 is a watercraft speed sensor 176 and a watercraft pitch sensor 178 that will sense the condition of the watercraft relative to the body of water and again indirectly the back pressure in the exhaust system. There is provided an atmospheric pressure sensor 180. There also is provided an exhaust back pressure sensor 182 in one of the exhaust manifolds 94.

Of course, the sensors described are only typical of those types of sensors which can be used. As will be recognized, more or less sensors can be used with an engine that is configured and arranged with certain features of the present invention. The components of the system as thus far described may be considered to be conventional and for that reason, where any component has not been illustrated or described in detail, reference may be had to conventional or known structures with which to practice the invention. Accordingly, the following is a more detailed discussion of such a construction having features, aspects and advantages of the present invention.

Figure 6:
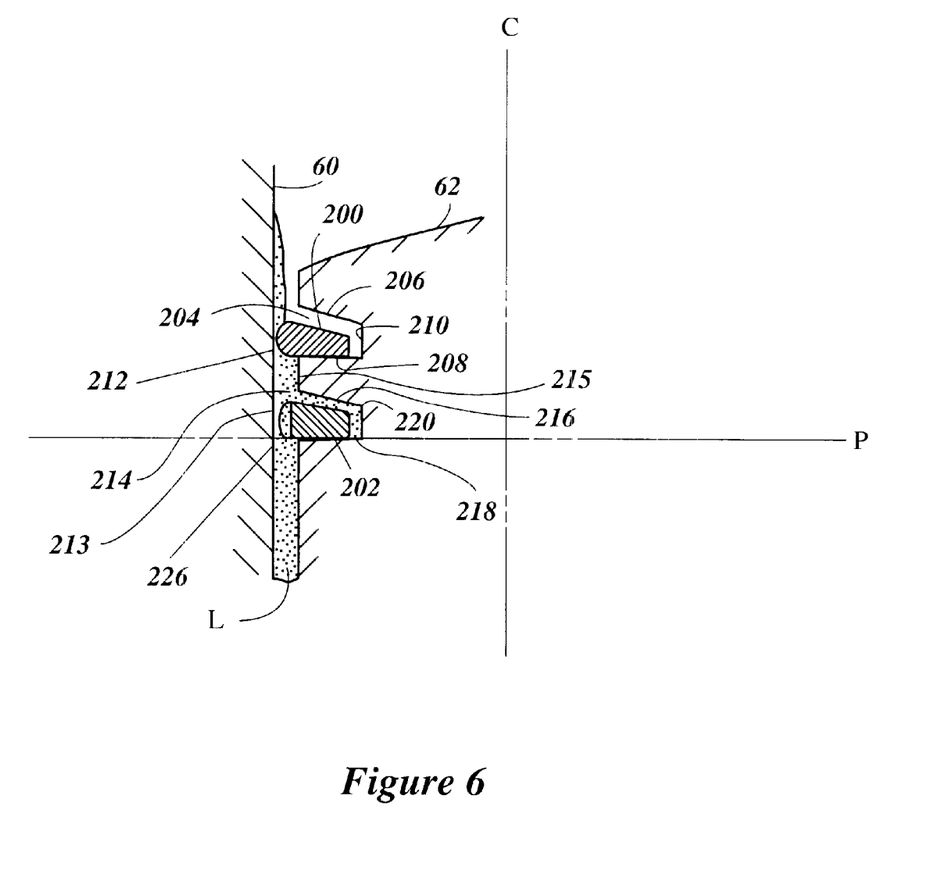
FIG. 6 is a cross-sectional view of a portion of the piston, piston ring and cylinder contained within the circle 6 of FIG. 4.

With reference now to FIG. 6, a cut-away cross-section of a piston and piston ring assembly arranged and configured in accordance with the present invention is illustrated therein. As discussed above, the piston 62 is received within the cylinder bore 60 for reciprocation. The piston 62 necessarily has a smaller overall outside diameter than the cylinder bore 60 in order to allow the reciprocation. Desirably, the piston operates within the oil bathed cylinder bore 60 of the internal combustion engine 44. The piston is lubricated by oil L or another suitable lubricant as is known by those of skill in the art.

To seal the combustion chamber 68 from the balance of the cylinder and the crankcase chamber section 72, the piston 62 is provided with at least one piston ring. In the illustrated arrangement, the piston 62 ring assembly uses two piston rings, a top compression ring 200 and a lower lubricant control ring 202, to maintain the seal. The rings can be made of iron, steel or other suitable materials in any known manner.

The top compression ring 200 is retained in a top ring groove 204 in the piston 62. The top ring groove 204 circumscribes an uppermost portion of the piston 62 in a well-known manner. As is known, the ring groove 204 may comprise a top face 206 and a bottom face which are either substantially parallel to one another or, as illustrated, the faces 206, 208 may diverge from one another at they progress radially outward. Desirably, the faces may be spaced from one another at an inner surface 210.

The top compression ring 200 is sized for confinement within and around the radially outwardly opening annular top ring groove 204. The top ring groove 204 and the top compression ring 200 act, along with a crown of the piston 62, as a first barrier for at least partially sealing of a lower end of the combustion chamber 68 from a lower portion of the cylinder below the top compression ring 200. Accordingly, the top compression ring 200 projects radially out of the groove 204 and has an outer surface 212, which is substantially parallel to the cylinder wall, that slidably bears against the same cylinder wall. The inner diameter of the compression ring 200 is desirably greater than the diameter of the inner surface of the ring groove 204 such that a gap is defined between the two members.

During compression and expansion strokes of the piston 62, the top compression ring 200 will act as an effective seal against a majority of the oil L deposited on the wall of the cylinder bore 60. As the gas pressure increases during the upward movement of the piston during the compression stroke, a corresponding pressure increase occurs on the top surface of the ring as well as against the radially inner surface of the ring forcing the ring against the oil film on the bore wall. Good ring tension is facilitated by the ultra low friction of the rings against the groove walls. The low friction is at least partially attributed to material selection, as will be discussed.

The lubricant control ring 202 is received by a second piston ring groove 214 which is set apart from the first ring groove 204 by a land 215. The second piston ring groove has a top surface 216 and a bottom surface 218. An interior wall 220 separates the innermost portions of the top surface 216 from the bottom surface 218. As illustrated, the top surface 216 and the bottom surface 218 may be diverge from one another or, as discussed above, the two surfaces 216, 218 of the ring groove 214 may be substantially parallel to one another. Preferably, no port or channel is provided through the piston that would allow lubricant to freely flow from between the rings 200, 202.

The illustrated control ring 202 is sized and configured to allow the control ring 202 to move somewhat within the second piston ring groove 214. The configuration of the control ring 202 will be described in an upstroke orientation. The control ring 202 has a top surface 222 that may slope gently upward in an outward direction. The control ring 202 also has a bottom surface 224 which is substantially parallel to the bottom surface 218 of the second ring groove 214. The ring 202 also comprises a wiping edge 226 defined about its perimeter. With continued reference now to FIG. 11, the ring 202 also preferably comprises a sloping outer edge. The slope of this edge can be varied as desired but, in a preferred arrangement, the sloping outer edge extends at about 30 degrees from normal to the centerline through the piston. Thus, in an arrangement in which the ring has a total thickness of approximately 2.05 mm, the sloping edge can have a rise of approximately 0.2 mm with a land separating the two sloping outer edges having a surface that is slightly rounded from sloping edge to sloping edge.

While the rings 200, 202 are relatively close fit within the grooves 204, 214, the rings fit the grooves so as to provide a slight gap between the top surfaces and the overlying surfaces of the grooves. The vertical width of the gap, as well as the angle of the gaps, is exaggerated in FIG. 6 for illustrative purposes. The gap is present between the top surfaces of the rings and the overlying surfaces for most of the piston stroke as the piston is moved upwardly in the cylinder. Typically, lubricating oil L is splashed or otherwise deposited on and around the cylinder wall from the engine crankcase when the piston is at or near the upper end of its stroke (i.e., at approximately top-dead-center "TDC").

Then, on the down stroke of the piston, the wiper edge of the ring tends to scrap a portion of the oil L deposited on the cylinder wall, while a portion of the oil L is left where originally deposited. Accordingly, as the piston completes the down stroke and reverses direction, oil L remaining on the wall above the wiper edge 213 tends to accumulate between the wiper edge 213 of the outer ring surface 226 and the wall above the wiper edge 213. The oil L may then be forced upward to the top compression ring 200 to lubricate the compression ring 200. Thus, the ring 200 is better lubricated. The better lubricated ring wears more slowly and is less likely to score the cylinder bore.

Figure 7:
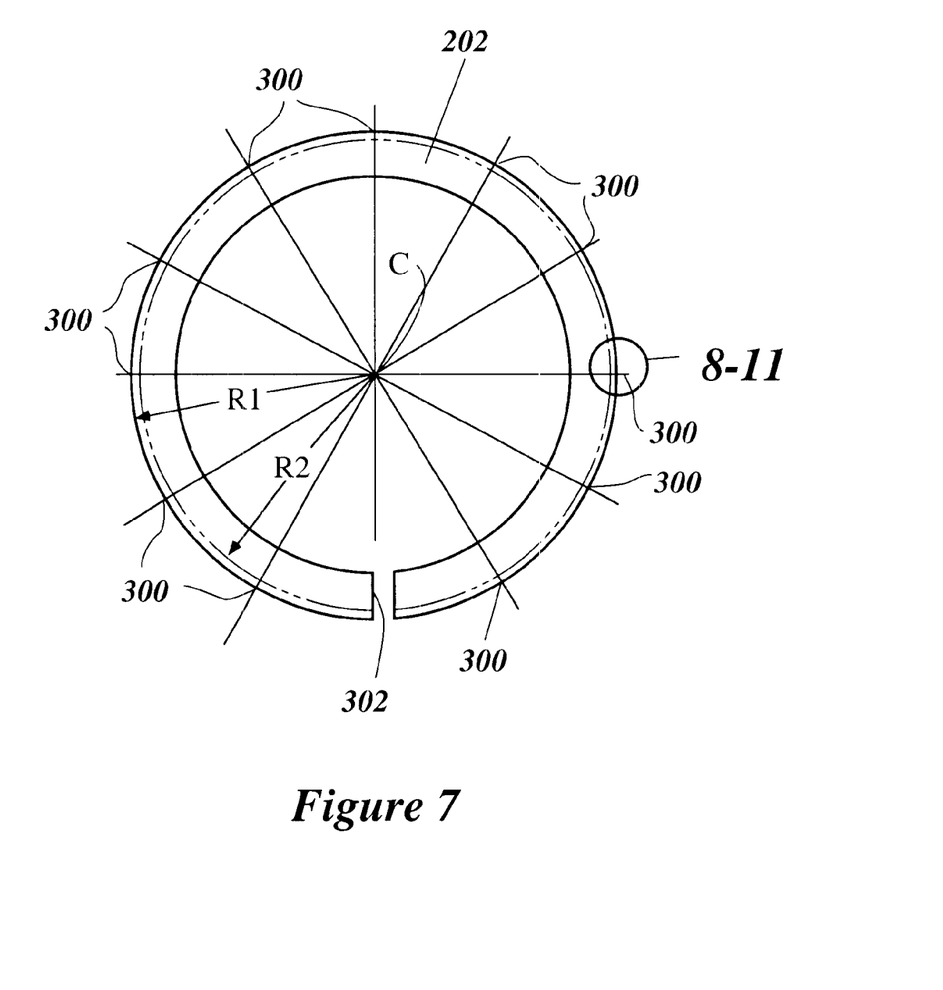
FIG. 7 is a plan view of a piston ring that is arranged and configured in accordance with certain features, aspects and advantages of the present invention.
Figure 8:
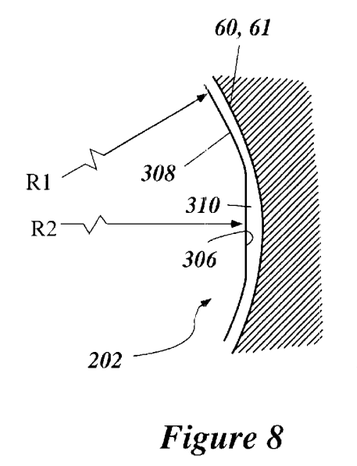
FIG. 8 is a partial plan view of a piston ring having a recess that is arranged and configured in accordance with certain features, aspects and advantages of the present invention.

With reference now to FIG. 7, the lower control ring 202 preferably comprises a plurality of recesses or grooves 300. In addition, the control ring 202 also preferably comprises a slit 302. The recesses 300 and the slit 302 will be described in more detail below. Preferably, as illustrated in FIGS. 7 and 8, the outer periphery of the ring 202 has a first radial dimension R1 that is defined from a central axis C of the ring 202 while the recess is positioned with a portion that lies at a second radial dimension R2 from the central axis C. In some applications, the outer periphery is not radiused, as illustrated in 6, and thus, the outer periphery can be the same radial dimension as the outer surface 226.

With continued reference to FIG. 7, the recesses 300 are positioned about the outer periphery of the ring 202. Preferably, the recesses 300 are spaced in a manner that results in substantially equal distribution about the outer periphery. In the illustrated arrangement, the ring 202 comprises eleven recesses 300 and a single slit 302. Thus, the illustrated recesses 300 are distributed substantially evenly with an angle of approximately 30 degrees being defined by centerlines extending through two adjacent recesses 300. Of course, in the illustrated arrangement, the slit 302 forms an additional recess such that twelve effective recesses are used to calculate the spacing.

With reference now to FIG. 6, the recesses 300 preferably are formed perpendicular to a plane P that is defined normal to the central axis C of the ring. Of course, in some arrangements, the recess could be inclined relative to the plane P to alter the manner in which the recess transmits lubricant. For instance, the recess could incline such that a larger recess is formed facing the crown of the piston, or combustion chamber, while a smaller recess is formed opposed the larger recess.

The slit 302 in the illustrated arrangement is used to receive a locking pin that secures the ring against rotation. One of ordinary skill in the art will readily recognize that the number of recesses can be varied and that the spacing of the recesses will be altered by such variations; however, it is presently preferred to use twelve effective recesses for better performance and lubricant distribution. When viewed in cross-section, the slit 302 preferably has a stepped configuration: the upper portion of the slit 302 is wider than the lower portion. More preferably, the upper portion of the slit is defined by two slightly diverging side walls. In one arrangement, the side walls slope apart at angles of about 15° from perpendicular to the lower surface of the ring (i.e., an included angle of about 30°). In such an arrangement, the distance across the slit at the upper surface is about 3.0 mm and the distance across the bottom edge of the upper portion is about 2.4 mm. The lower portion of such a slit preferably is defined by two substantially parallel surfaces that are separated by about 0.30 mm to about 0.40 mm. In one arrangement in which the ring has a maximum thickness of about 2.05 mm, the lower portion has a thickness of about 0.85 mm.

While the illustrated arrangement features equally spaced recesses, one of ordinary skill in the art would recognize that the spacing could be varied. The effect of such spacing variations upon lubricant distribution would vary depending at least in part upon the type of engine and the orientation of the cylinders; however, in the illustrated arrangement, which features a direct injected, two-cycle engine having horizontally arranged cylinders, the substantially equal spacing is presently preferred.

Figure 12:
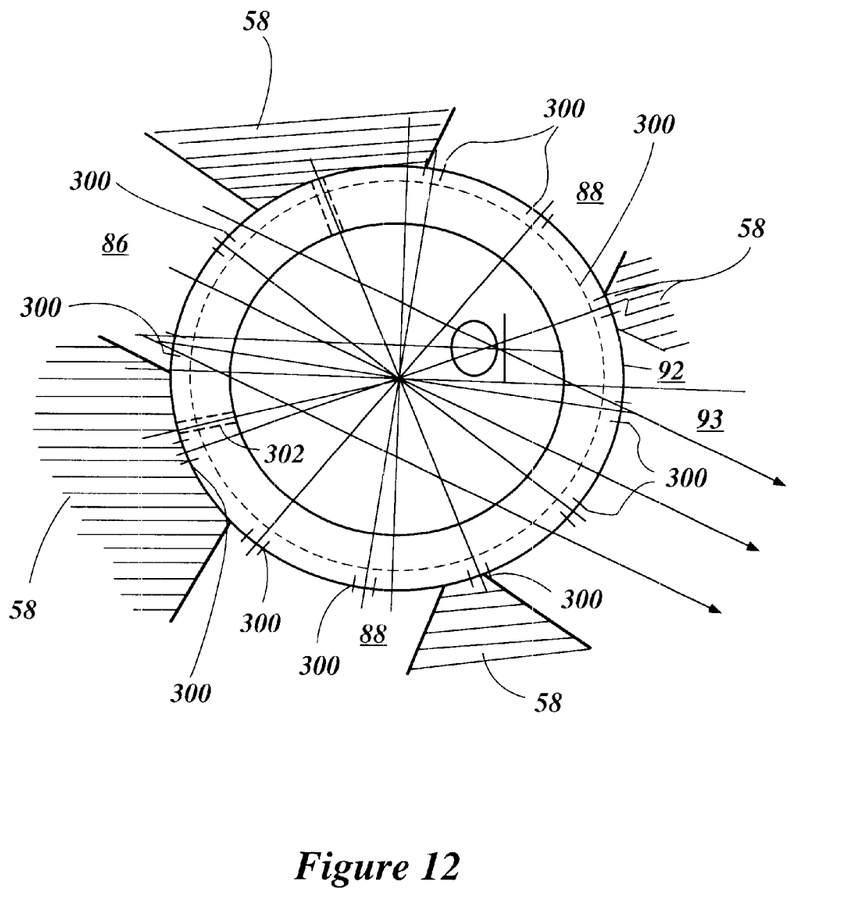
FIG. 12 is a plan view of the piston ring and a relationship between recesses of the piston ring and various ports of the cylinder.

With reference now to FIG. 12, a preferred relationship between the illustrated gaps, recesses and cylinder ports will be described. The illustrated cylinder 58 comprises the exhaust passage 93 and the exhaust port 92. In addition, the illustrated cylinder 58 comprises a set of scavenge ports 86, 88 that are associated with scavenge passages that empty into the cylinder through the cylinder wall.

With continued reference to FIG. 12, at least one of the recesses 300 is aligned proximate an edge of the exhaust port 92. In this manner, as the piston 62 and piston rings 200, 202 deform relative to the bore in which the piston 62 and piston rings 200, 202 are positioned, the recesses are positioned such that the lubrication to the sealing ring 200 can be improved. In particular, the lubricant is more evenly distributed. In addition, at least one of the recesses 300 also is positioned within each of the illustrated ports. In these positions, when lubricant drops under gravity to a lower position within each of the bores, the sealing ring 200 again can be more evenly lubricated. For instance, because only a preset amount of lubricant can pass through any single recess, the lubricant is squeezed about the piston during the upwardly sweeping movement of the piston and the lubricant thus lubricates more of the circumference of the compression ring 200 than in arrangements not featuring such recesses.

With reference now to FIGS. 8–11, four preferred recess profiles are illustrated therein. In the illustrated arrangement, the profiles are defined by a side surface 306 that extends between a top surface and a bottom surface of the ring 202. The side surface 306 generally forms an incongruency in the outer surface 308 of the ring and preferably extends at least partially through the entire thickness of the ring. In some arrangements, such as the illustrated arrangements, the side surface 306 extends completely through the thickness of the ring 202. In other arrangements, the side surface 306 can extend only partially through the thickness of the ring 202.

In the arrangement illustrated in FIG. 8, the side surface 306 forms a chord between two locations along the circumference of the outer surface 308. This arrangement forms a small recess that defines an elongated channel 310 having a reduced crossing dimension and an increased transverse dimension.

Figure 9:
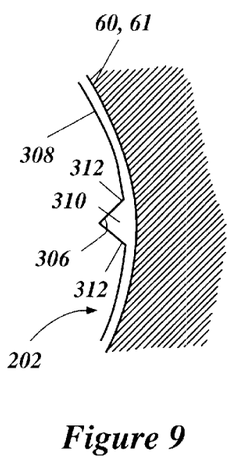
FIG. 9 is a partial plan view of another piston ring having a recess that is arranged and configured in accordance with certain features, aspects and advantages of the present invention.

In the arrangement illustrated in FIG. 9, the side surface 306 comprises a pair of surfaces 312 that extend at an angle relative to one another such that a triangular channel 310 is defined. Such an arrangement increases the crossing dimension while decreasing the transverse dimension of the channel 310. Accordingly, the channel 310 allows increased flow with more localized changes to the quality of compression ring lubrication.

Figure 10:
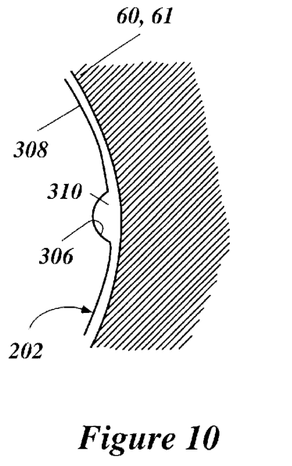
FIG. 10 is a partial plan view of another piston ring having a recess that is arranged and configured in accordance with certain features, aspects and advantages of the present invention.

In the arrangement illustrated in FIG. 10, the side surface 306 comprises a generally semicircular wall. The semicircular channel 310 increases the crossing dimension but decreases the transverse dimension. In addition, as will be recognized, the flow of viscous lubricants through the semicircular channel is varied as compared to flow through the triangular channel of FIG. 9, for instance. Accordingly, the semicircular channel 310 provides increased lubrication to the piston ring and expands the affected areas as compared to the triangular channel 310 of FIG. 9, for instance.

Figure 11:
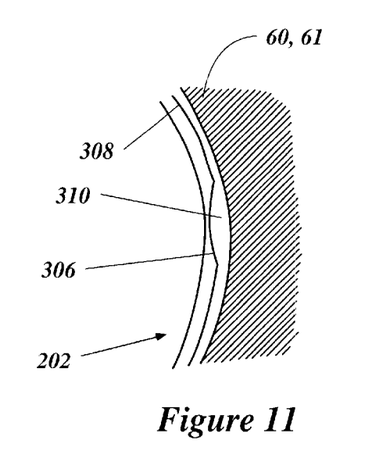
FIG. 11 is a partial plan view of another piston ring having a recess that is arranged and configured in accordance with certain features, aspects and advantages of the present invention.

In the arrangement illustrated in FIG. 11, the side surface 306 comprises an arc of a preferred radius. The arc, of course, defines an arcuate channel 310. The arcuate channel 310 increases the transverse dimension while also increasing the crossing dimension as compared to a chordal channel such as that of FIG. 8. Accordingly, the arcuate channel 310 has been found to be a preferred compromise from a variety of configurations through testing and evaluation. Of course, while any number of channel dimension can be used, however, the preferred arrangement is sized such that in one arrangement, the transverse dimension (i.e., normal to radial) is approximately 4.0 mm while the crossing dimension (i.e., radial) is approximately 0.12 mm.

Although this invention has been described in terms of a certain preferred arrangements, other arrangements apparent to those of ordinary skill in the art also are within the scope of this invention. For instance, the profiles of the recesses can be mixed on a single ring. Moreover, the spacing and distribution can be varied. In some arrangements, more than two rings can be used. Thus, various changes and modifications may be made without departing from the spirit and scope of the invention. Accordingly, the scope of the invention is intended to be defined only by the claims that follow.

What is claimed is:

1. A piston ring for use on a piston of an internal combustion engine, said piston ring comprising a top surface, a bottom surface, an inside surface connecting said top surface to said bottom surface, an outside surface connecting said top surface to said bottom surface, a plurality of recesses being formed in said outer surface, a gap being formed that extends inward from said outside surface, said gap forming an additional recess and said recesses being substantially equally spaced about a circumference of said piston ring and said piston ring being formed of a material suitable for use in an internal combustion engine.

2. The piston ring of claim 1, wherein said gap extends completely through said ring from said top surface to said bottom surface and from said outside surface to said inner surface.

3. A piston ring for use on a piston of an internal combustion engine, said piston ring comprising a top surface, a bottom surface, an inside surface connecting said top surface to said bottom surface, an outside surface connecting said top surface to said bottom surface, a plurality of recesses being formed in said outside surface, wherein said recesses are substantially equally spaced about a circumference of said piston ring, and said piston ring is formed of a material suitable for use in an internal combustion engine.

4. A piston ring for use on a piston of an internal combustion engine, said piston ring comprising a top surface, a bottom surface, an inside surface connecting said top surface to said bottom surface, an outside surface connecting said top surface to said bottom surface, a plurality of recesses being formed in said outside surface, wherein said recesses extend from sad top surface to said bottom surface, and said piston ring is formed of a material suitable for use in an internal combustion engine.

5. The piston ring of claim 4, wherein said recesses arc substantially equally disposed about a circumference of said piston ring.

6. The piston ring of claim 5, wherein said recesses are spaced approximately 30 degrees on center from each adjacent recess.

7. The piston ring of claim 4, wherein said recess is formed by a single side wall.

8. The piston ring of claim 7, wherein said single side wall defines a chord of said piston ring.

9. The piston ring of claim 7, wherein said single side wall comprises an arcuate configuration.

10. The piston ring of claim 7, wherein said single side wall comprises a semicircular configuration.

11. The piston ring of claim 4, wherein said recess is formed by more than one side wall.

12. The piston ring of claim 11, wherein said side walls comprise a triangular configuration.

13. A piston ring for use on a piston of an internal combustion engine, said piston ring comprising an outer surface and a central axis, a peripheral portion of said outer surface generally being defined at a first distance from said central axis and defining a maximum distance from said central axis, a plurality of recesses being positioned along said outer surface, said recesses being substantially equally spaced about a circumference of said piston ring, at least a portion of said recesses being disposed at a second distance from said central axis, said first distance being greater said second distance, said recesses extending through said peripheral portion of said outer surface and said piston ring being formed of a material suitable for use in an internal combustion engine.

14. The piston ring of claim 13, wherein said portions of said recesses being disposed at said second distance from said central axis form maximum depths of said recess from said peripheral portion of said outer surface.

15. The piston ring of claim 13, wherein said first distance is a radial distance, said second distance is a radial distance, and said maximum distance is a radial distance.

16. The piston ring of claim 13, further comprising a gap being defined through said piston ring.

17. The piston ring of claim 13, wherein at least one of said recesses is defined by a surface that extends perpendicular to a plane extending normal to said central axis.

18. The piston ring of claim 17, wherein a plurality of said recesses are defined by a corresponding plurality of surfaces that extend perpendicular to said plane extending normal to said central axis.

19. The piston ring of claim 18, wherein said plurality of surfaces are curved.

20. The piston ring of claim 17, wherein at least one of said recesses is defined by a pair of intersecting surfaces that extend perpendicular to a plane extending normal to said central axis.

21. An engine comprising a cylinder body, at least one cylinder bore extending through at least a portion of said cylinder body and being defined by a cylinder wall, a piston being reciprocally mounted within said cylinder bore, a crankshaft being coupled to said piston such that axial movement of said piston causes rotational movement of said crankshaft, an annular cavity being defined between said piston and said cylinder wall, a lubrication control ring being positioned about a portion of said piston and extending into said annular cavity, a compression ring also being positioned about a portion of said piston and extending into said annular cavity, said lubrication control ring being interposed between said compression ring and said crankshaft, said lubrication control ring comprising an outer surface that is positioned substantially adjacent said cylinder wall, said outer surface comprising a plurality of recesses that define a corresponding plurality of channels extending between a first portion of said annular cavity and a second portion of said annular cavity and said first portion being separated from said second portion by said lubrication control ring, and wherein said engine further comprises an exhaust port that is defined through a region of said cylinder wall and at least one recess is positioned along a portion of said outer surface that slides over said region of said cylinder wall.

22. An engine comprising a cylinder body, at least one cylinder bore extending through at least a portion of said cylinder body and being defined by a cylinder wall, a piston being reciprocally mounted within said cylinder bore, a crankshaft being coupled to said piston such that axial movement of said piston causes rotational movement of said crankshaft, an annular cavity being defined between said piston and said cylinder wall, a lubrication control ring being positioned about a portion of said piston and extending into said annular cavity, a compression ring also being positioned about a portion of said piston and extending into said annular cavity, said lubrication control ring being interposed between said compression ring and said crankshaft, said lubrication control ring comprising an outer surface that is positioned substantially adjacent said cylinder wall, said outer surface comprising a plurality of recesses that define a corresponding plurality of channels extending between a first portion of said annular cavity and a second portion of said annular cavity and said first portion being separated from said second portion by said lubrication control ring, and wherein said engine further comprises an exhaust port that is defined through a region of said cylinder wall and at least one recess is positioned along a portion of said outer surface that does not slide over said region of said cylinder wall.

23. The engine of claim 22, wherein at least one recess is positioned along a portion of said outer surface that does slide over said region of said cylinder wall.

24. The engine of claim 22, wherein said piston reciprocates along a cylinder axis and said cylinder axis extends along a generally horizontal direction when said engine is in operation.

25. The engine of claim 22 further comprising at least one scavenge intake passage extending through a portion of said cylinder body and at least one fuel injector being disposed to directly inject fuel into said cylinder.

26. The engine of claim 25, wherein said lubrication control ring is restrained from rotational movement about a cylinder axis along which said piston reciprocates.

27. The engine of claim 26, wherein said lubrication control ring further comprises a gap that forms a discontinuity in said ring, said gap being receptive of a pin that secures said lubrication control ring against rotation about said cylinder axis.

28. The engine of claim 22, wherein said crankshaft extends in a generally vertical direction when said engine is in operation.

29. The engine of claim 22, wherein said piston reciprocates along a generally horizontal axis and said crankshaft rotates about an axis that is generally normal to said axis of said piston.

30. The engine of claim 22, wherein said outer surface of said lubrication control ring comprises a radiused surface that extends from an upper surface of said lubrication control ring to a lower surface of said lubrication control ring.

31. The engine of claim 22 further comprising a cylinder sleeve that is interposed within said cylinder bore between said cylinder body and said lubrication control ring.

32. The engine of claim 31, wherein said cylinder sleeve and said lubrication control ring are formed of the same material.

33. The engine of claim 32, wherein said material is iron or steel.

34. An engine comprising a cylinder body, a cylinder bore being formed within said cylinder body and defining a cylinder, a piston positioned within said cylinder and being capable of reciprocating within said cylinder, a compression ring being disposed about a portion of said piston, said piston being drivingly connected to a crankshaft, said crankshaft being journaled within a crankcase chamber that is at least partially defined by a crankcase cover, a combustion chamber being defined at least in part by said cylinder bore and said piston, a fuel injector being disposed to inject fuel directly into said combustion chamber, a scavenge passage being formed within said cylinder body such that it selectively connects said combustion chamber and said crankcase chamber, a cylinder sleeve being positioned within said cylinder bore and being interposed between said piston and said cylinder body, said cylinder sleeve and said compression ring both being formed of the same material, and means for controlling the lubrication of said compression ring being positioned within said cylinder body.

35. The engine of claim 34, wherein said piston reciprocates along a cylinder axis that extends in a generally horizontal direction when said engine is operating.

36. The engine of claim 34, wherein said crankshaft rotates about a generally vertical direction when said engine is operating.

37. The engine of claim 34, wherein said compression ring is restrained from rotation about an axis defined through said piston and along which said piston reciprocates.

38. The engine of claim 34, wherein said cylinder sleeve and said compression ring are both formed from iron or steel.

39. The engine of claim 21 wherein said crankshaft extends in a generally vertical direction when said engine is in operation.

40. The engine of claim 21 wherein said piston reciprocates along a generally horizontal axis and said crankshaft rotates about an axis that is generally normal to said axis of said piston.

41. The engine of claim 21, wherein said outer surface of said lubrication control ring comprises a radiussed surface that extends from an upper surface of said lubrication control ring to a lower surface of said lubrication control ring.

42. The engine of claim 21 further comprising a cylinder sleeve that is interposed within said cylinder bore between said cylinder body and said lubrication control ring.

43. The engine of claim 42, wherein said cylinder sleeve and said lubrication control ring are formed of the same material.

44. The engine of claim 43, wherein said material is iron or steel.

* * * * *